Aug. 8, 1967   J. F. CLEARMAN   3,334,651
LIQUID LEVEL CONTROL
Filed May 26, 1964
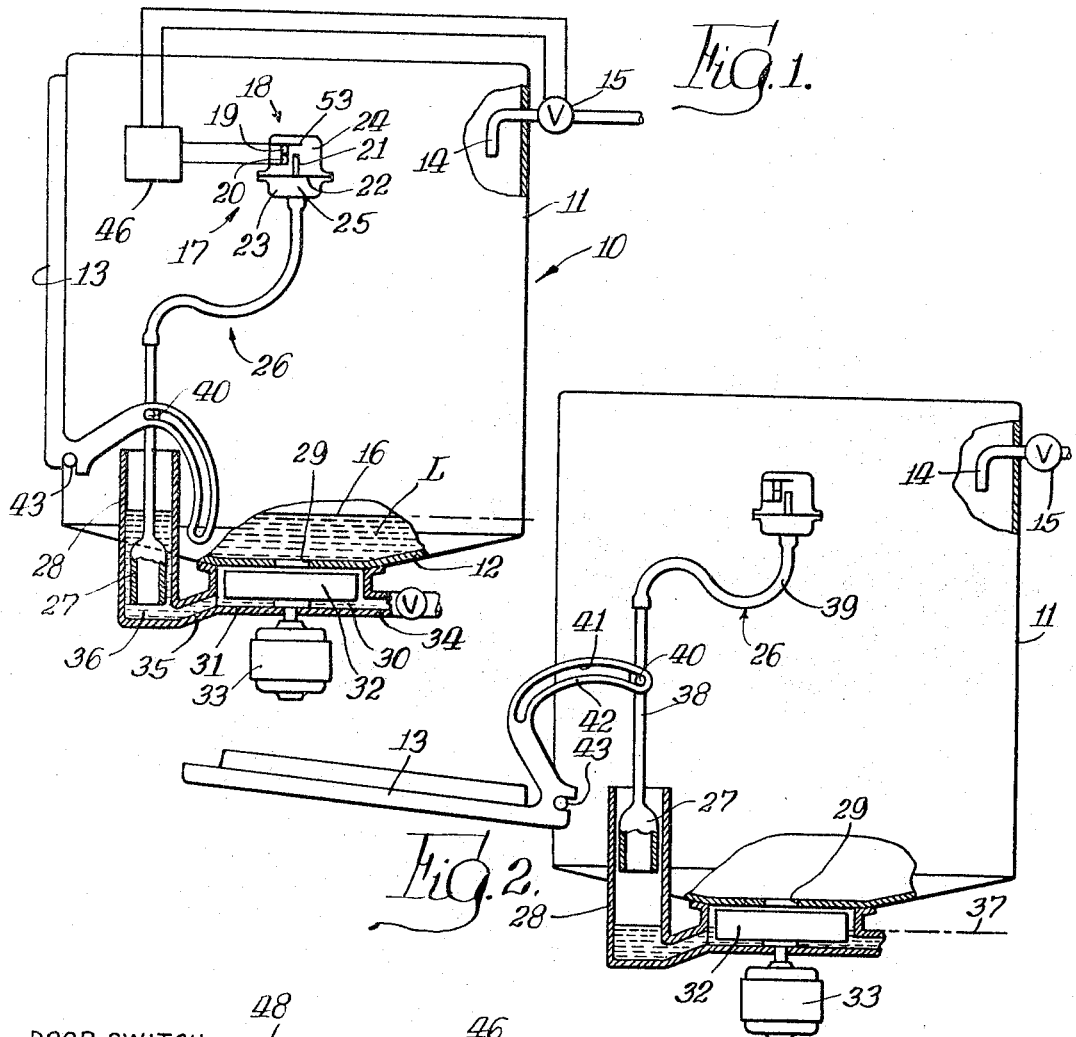
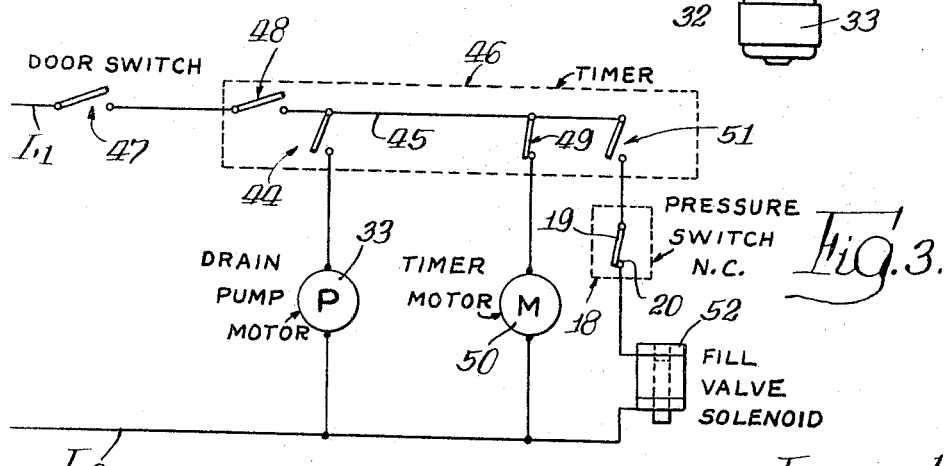
Inventor:—
Jack F. Clearman
By Hofgren, Wegner, Allen,
Stellman & McCord Attys.

United States Patent Office 3,334,651
Patented Aug. 8, 1967

3,334,651
LIQUID LEVEL CONTROL
Jack F. Clearman, White Bear Lake, Minn., assignor to Whirlpool Corporation, a corporation of Delaware
Filed May 26, 1964, Ser. No. 370,315
8 Claims. (Cl. 137—390)

This invention relates to liquid level control means and in particular to means for controlling the level of liquid where the desired head is relatively small such as in dishwasher apparatus.

One well known form of liquid level control comprises a mechanism responsive to air pressure to selectively close an electric switch. Such controls are conventionally associated with laundry apparatus wherein a relatively large head of water is provided in the tub so that this head of water may act through a suitable air filled duct leading to the switch to regulate automatically the filling of the tub as by controlling a solenoid operated fill valve. In copending application of John B. Lyman, Ser. No. 381,186, filed July 8, 1964, and assigned to the assignee hereof, an arrangement of such a control is shown for use in an apparatus such as a dish washing apparatus wherein the maximum liquid level is relatively low. The present invention comprehends an arrangement wherein a similar control device is utilized, but having different, novel means for maintaining the air duct to the control effectively free of liquid. More specifically, the present invention comprehends an improved liquid level control wherein the air duct means for transmitting the head pressure of the liquid in the tub is periodically raised above the level of the liquid thereby to assure the elimination of any liquid from the duct means, and thereby assure an accurate functioning of the control.

Thus, a principal feature of the invention is the provision of a new and improved liquid level control means.

A further feature of the invention is the provision of such a control means having new and improved means for assuring maintained accurate transmission of a liquid head pressure to the control mechanism.

A further feature of the invention is the provision of such a liquid level control means in an apparatus having an access door and means associated with the door for effectively eliminating all liquid from the air duct as a result of opening and closing movements of the door.

A yet further feature of the invention is the provision of such control means including means for periodically raising the air duct means above the level of liquid to assure removal of any liquid from the duct means which may have entered thereinto.

Still another feature of the invention is the provision of such control means in an apparatus having an access door, further including means associated with the door for selectively raising and lowering the air duct means to above and below the preselected full level of the liquid being controlled.

Other features and advantages of the invention will be apparent from the following description taken in connection with the accompanying drawing wherein:

FIGURE 1 is a side elevation of a dishwasher apparatus having a liquid level control means embodying the invention associated therewith, portions thereof being broken away to illustrate the internal construction thereof;

FIGURE 2 is a view generally similar to that of FIGURE 1, but with the access door of the dishwasher in open position and with the air duct means in an uppermost position; and FIGURE 3 is a schematic wiring diagram of the control circuit of the dishwasher apparatus.

In the exemplary embodiment of the invention as disclosed in the drawing, a dishwasher apparatus generally designated 10 is shown to comprise a container, or tub, 11 having a bottom wall 12 and a door 13 for selectively providing access to the interior of the tub, such as for loading and removing dishes therefrom. Dish washing liquid, such as hot water, is delivered to the tub through an inlet conduit 14 controlled by a solenoid valve 15. As is conventional in such dishwasher apparatus, the maximum level 16 of the dish washing liquid L in the lower portion of the dishwasher tub is relatively low.

The opening and closing of the solenoid valve 15 is regulated by a control generally designated 17 which includes a normally closed switch 18 having a moving contact 19 and a fixed contact 20, the moving contact 19 having associated therewith an operating finger 53 adapted to be engaged by an actuator 21 carried on a diaphragm 22 extending across the interior of a switch housing 23 so as to form within the switch housing a switch chamber 24 and a pressure chamber 25. Communicating with the pressure chamber 25 is a duct 26 having at its lower end an air bell 27 received in an upright tube 28 extending from substantially below the bottom of the tub wall 12 to substantially thereabove.

The bottom wall 12 of the tub 11 defines an outlet, or drain, opening 29 communicating with a pump chamber 30 defined by a pump housing 31 and the bottom wall 12. A fluid impeller, or pump, 32 of conventional construction is disposed within the chamber 30 and is arranged to be operated by a conventional drive means, such as electric motor 33. The pump housing 31 further defines a valved outlet 34 for delivery of the liquid from the chamber 30 to a suitable point of disposal (not shown) such as a conventional drain. The pump housing 31 still further defines a passage structure 35 providing communication between the pump chamber 30 and the lower end of the space 36 within the tube 28. Thus, a portion of the liquid L delivered from inlet 14 to the tub 11 passes downwardly through opening 29, chamber 30, and passage 35 into the tube 28 so as to transmit a head pressure to the air within the bell 27 and duct 26 and thereby apply this pressure to the underside of the diaphragm 22. The control switch 18 is arranged to have the upward displacement of the diaphragm 22 cause the actuator 21 to engage finger 53 and space moving contact 19 above fixed stationary contact 20 so as to cause valve 15 to close as will be described more fully hereafter.

Referring now to FIGURE 2, when the access door 13 is moved to the open position, the air bell 27 is automatically raised to an uppermost position which is substantially above the minimum level 37 of the liquid L such as at the completion of the draining of the tub 11. More specifically, the duct 26 includes a rectilinear rigid lower portion 38 and a flexible upper portion 39. A cam follower 40 is mounted on the rigid portion 38 of the duct and is received in an arcuate groove 41 of a cam track 42 secured to the door 13. The curvature of the groove 41 is made eccentric to the pivot 43 of the door 13 so that when the door is in the open position, as shown in FIGURE 2, the cam follower 40 is raised to a maximum elevation wherein the air bell 27 is substantially above the minimum level 37 of the liquid L. Thus, any liquid which may have previously entered into the air bell such as by absorption of the air therein into the liquid is caused to drain from the air bell. During such upward movement of the air bell, the tubular member 28 acts as a guide and the flexible portion 39 of the duct flexes, as shown in FIGURE 2, to accommodate the vertical movement of the rigid portion 38. When the door 13 is closed, the cam track 42 urges the follower 40 downwardly to dispose the air bell 27 in the lowermost portion 36 of the tubular member 28 whereby the level of the liquid L once again produces a pressure head acting through the duct 26 against the diaphragm 22 of the control 17.

Referring now to FIGURE 3, the drain pump motor 33 is connected from one head $L_2$ of the power supply through a cam switch 44 connected to a bus 45 within timer 46 of the control 17. Bus 45 is connected to the other power supply lead $L_1$ through a normally opened door switch 47 and a normally opened push-pull switch 48 in the timer. When the switches 47 and 48 are closed, a circuit is completed from lead $L_1$ through a normally closed timer switch 49 to the timer motor 50 which in turn is connected to the other power supply lead $L_2$. The energization of timer motor 50 commences the operation of the timer 46 through the preselected dish washing cycle. The filling of the tub 11 is effected by the closing of a normally opened cam switch 51 connected from bus 45 to the moving contact 19 of the pressure switch 18. As shown in FIGURE 3, the fixed contact 20 of the pressure switch is connected to the solenoid 52 of the solenoid valve 15, the solenoid in turn being connected to the other power supply lead $L_2$ thereby to complete the circuit from lead $L_1$ through the solenoid to lead $L_2$ and cause the valve 15 to open and deliver dish washing liquid, such as hot water, into the tub.

The tub continues to fill until the level thereof reaches level 16. At this point the cumulative head of the water in the tub and downwardly to the bottom of the air bell 27 is sufficient to raise the diaphragm 22 to cause switch 18 to open and thereby de-energize the solenoid 52 and stop further delivery of the hot water to the tub. As the duct 26 is completely air filled, any liquid previously therein having been drained by the previous opening of the door 13, an accurate sensing of the level of the dish washing liquid is obtained. Further, switch 18 may comprise a conventional air actuated switch having a relatively high head actuation requirement.

The timer 46 may include additional conventional switches (not shown) for controlling additional functions of the dishwasher. However, these have no bearing on the present invention and are omitted for facilitated understanding of the present invention.

While I have illustrated the invention as including a duct elevating means actuated by the access door, it is to be understood that the invention further broadly comprehends the utilization generally of means associated with the dishwasher capable of selectively raising and lowering the duct and in particular the bell portion 27, such as manually operable means and/or mechanism operated by the timer 46.

While I have shown and described one embodiment of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. Apparatus comprising: a container for holding liquid and having a bottom; manually operable means for controlling a condition of said container; means for draining the liquid from the container; control means responsive to air pressure for providing a tub-fill signal; means defining a duct having air therein and a lower portion opening to the bottom of the container for providing communication between said control and the bottom of the container for transmitting to the control the head pressure of the liquid; means for movably supporting said lower portion of the duct for selective disposition thereof above and below the level of the liquid in said container; and means operated by said manually operable means for selectively raising the duct means above the level of the liquid to provide communication between the duct and the ambient air thereby to effectively preclude false operation of the control means as by the presence of liquid in said duct.

2. Apparatus comprising: a container for holding liquid and having a bottom; means for draining the liquid from the container; control means responsive to air pressure for providing a tub-fill signal; means defining a duct having air therein and a lower portion opening to the bottom of the container for providing communication between said control and the bottom of the container for transmitting to the control the head pressure of the liquid; means for movably supporting said lower portion of the duct for selective disposition thereof above and below the level of the liquid in said container; and means for selectively raising the duct means above the level of the liquid to provide communication between the duct and the ambient air thereby to effectively preclude false operation of the control means as by the presence of liquid in said duct.

3. The apparatus of claim 1 wherein said container includes an access opening and said manually operable means comprises means for selectively closing said opening and means associated with said opening-closing means for selectively raising the duct means above the level of the liquid.

4. The apparatus of claim 3 wherein said last-named means comprises cooperating cam track and follower means on said opening-closing means and duct means.

5. The apparatus of claim 2 wherein said duct means includes a flexible portion.

6. The apparatus of claim 2 wherein said duct means includes an air bell portion at its lower end.

7. Apparatus comprising: a container for holding liquid and having a bottom; means for draining the liquid from the container; means defining a passage extending from said bottom to a preselected level lower than that of the bottom and having an upright tubular guide disposed laterally of said container and communicating at its lower end with said passage; control means responsive to air pressure for providing a tub-fill signal; means defining a duct having air therein and a lower portion opening to said guide for providing communication between said control and said passage for transmitting to the control the cumulative head pressure of liquid in the tub and passage; means for movably supporting said lower portion of the duct for selective disposition thereof above and below the level of the liquid in said guide; and means for selectively raising said lower portion of the duct means above the level of the liquid to provide communication between the duct and the ambient air thereby to effectively preclude false operation of the control means as by the presence of liquid in said duct.

8. Apparatus comprising: a container for holding liquid and having a bottom and an access opening; a door for selectively closing said opening; means for draining the liquid from the container; means defining a passage extending from said bottom to a preselected level lower than that of the bottom and having an upright tubular guide disposed laterally of said container and communicating at its lower end with said passage; control means responsive to air pressure for providing a tub-fill signal; means defining a duct having air therein and communicating between said control and said passage for transmitting to the control the cumulative head pressure of liquid in the tub and passage, said duct means having an open lower end received in said guide; and means associated with said door for selectively raising said lower end of the duct means above the level of the liquid to provide communication between the duct and the ambient air thereby to effectively preclude false operation of the control means as by the presence of liquid in said duct.

(References on following page)

References Cited

UNITED STATES PATENTS

| | | | |
|---|---|---|---|
| 2,565,150 | 8/1951 | Stageberg | 134—57 X |
| 2,592,314 | 4/1952 | Morton | 137—387 |
| 3,064,094 | 11/1962 | Marchi | 200—83 X |

FOREIGN PATENTS 795,096   5/1958   Great Britain.

WILLIAM F. O'DEA, *Primary Examiner.*
D. R. MATTHEWS, *Assistant Examiner.*